United States Patent [19]

Tellier

[11] Patent Number: 4,998,740
[45] Date of Patent: Mar. 12, 1991

[54] FACE SEAL ASSEMBLY

[75] Inventor: Gilbert F. Tellier, West Hills, Calif.

[73] Assignee: Rockwell International Corporation, El Segundo, Calif.

[21] Appl. No.: 414,966

[22] Filed: Sep. 29, 1989

[51] Int. Cl.$^5$ ................................................. F16J 9/16
[52] U.S. Cl. .................................... 277/205; 277/180; 277/227; 277/235 A
[58] Field of Search ............... 277/205, 206 R, 206 A, 277/207, 235 R, 235 A, 180, 167.5, 27, 178; 285/910, 917, 918, 336

[56] References Cited

U.S. PATENT DOCUMENTS

| | | | |
|---|---|---|---|
| 1,866,160 | 7/1932 | Griswold, Jr. | 285/336 |
| 2,459,608 | 1/1949 | Wolfram | 285/340 |
| 3,083,023 | 3/1963 | Creavey | 277/180 |
| 3,285,615 | 11/1966 | Trbovich | 277/180 |
| 3,307,861 | 3/1967 | Adam et al. | 277/180 |
| 4,262,690 | 4/1981 | Binegar | 277/117 |

FOREIGN PATENT DOCUMENTS

| | | | |
|---|---|---|---|
| 0700414 | 12/1964 | Canada | 277/227 |
| 0774464 | 12/1967 | Canada | 277/363 |
| 2517789 | 6/1983 | France | 277/227 |
| 0192670 | 11/1982 | Japan | 277/227 |

Primary Examiner—William A. Cuchlinski, Jr.
Assistant Examiner—Daniel G. DePumpo
Attorney, Agent, or Firm—H. Frederick Hamann; Harry B. Field; Steven E. Kahm

[57] ABSTRACT

An improved face seal assembly (10) is provided to prevent fluid leakage between assembled structural components (12), (14) or the like, such as housing components of a fluid control valve or the like. The face seal assembly (10) comprises a metal seal ring (16) defined by a rigid seal base (22) having generally parallel axial side faces (24), in combination with a pair of deflectable seal legs (26) extending generally radially from the seal base as axially diverging continuation of said side faces. The seal ring (16) is sandwiched coaxially between a pair of film gaskets (18) of a selected seal material, preferably such as a Teflon coated polyimide film. The resultant seal ring and gasket stack forms the face seal assembly (10) and is interposed between assembled housing components or the like to deflect the seal legs (26) toward each other into substantially coplanar relation with the axial side faces (24) of the seal base (22).

14 Claims, 1 Drawing Sheet

FACE SEAL ASSEMBLY

STATEMENT OF GOVERNMENT INTEREST

The Government has rights in this invention pursuant to Contract F04611-85-C-0047 awarded by the U.S. Department of Air Force.

BACKGROUND OF THE INVENTION

This invention relates generally to improvements in mechanical face seals of the type designed to prevent or minimize fluid leakage between assembled structural components, such as assembled housing components of a fluid flow control valve or fluid flow conduits or the like. More particularly, this invention relates to an improved yet relatively simple face seal assembly adapted for economical production and reliable, reusable service in relatively high pressure environments of operation.

Mechanical face seals are well known in the art for use in preventing or minimizing fluid leakage between assembled mechanical structures, particularly such as assembled housing components of a fluid control or regulator valve or the like. In one common form, face seals are defined by standard elastomer O-rings or other nonmetallic packing materials which are compressively retained between mechanical structures to prevent or limit undesired fluid leakage. Such nonmetallic face seal devices are relatively economical and provide satisfactory sealing function throughout a relatively non-hostile range of operating conditions, such as operation at relatively low pressures, moderate temperature extremes, and/or exposure to non-corrosive fluids and the like. However, in some environments of use, improved face seals of a more sophisticated design and/or engineered material are required to accommodate adverse operating conditions.

More specifically, a variety of improved and relatively complex face seals have been designed for specialized use in relatively high pressure, extreme temperature environments, or other adverse operating conditions. Such specialized face seals commonly include one or more deflectable seal legs adapted for compression engagement with assembled structural components to prevent fluid leakage therebetween. Face seal configurations of generally U-shaped, V-shaped and K-shaped geometries are known in the art. To accommodate adverse operating conditions, such as relatively high pressures of several hundred to several thousand psi, such face seals are normally constructed from relatively hard metals which are coated with a seal film, typically such as a Teflon coating or a soft metal coating or the like. However, such coatings are difficult to apply in precision thicknesses which may be necessary to conform with close tolerances, resulting in face seals which are relatively costly to manufacture. Moreover, such coatings tend to deform and/or wear away during use, resulting in mandatory seal replacement whenever the related structures are disassembled, for example, for repair and maintenance purposes. In some instances, the seal coating can encounter sufficient wear to result in seal failure and/or brinnelling damage of seal surfaces caused by direct contact of the hard metal seal with adjacent structural surfaces.

There exists, therefore, a significant need for improvements in mechanical face seals, particularly with respect to the provision of a relatively simple and economical face seal designed to prevent or minimize fluid leakage in high temperature or high pressure or other adverse operating environments. Moreover, there exists a need for an improved face seal which can be reused following disassembly of associated housing structures. The present invention fulfills these needs and provides further related advantages.

SUMMARY OF THE INVENTION

In accordance with the invention, an improved face seal assembly is provided for preventing or minimizing fluid leakage between assembled structural components, such as assembled housing components in a fluid control valve or the like. The face seal assembly comprises a seal member of annular shape or the like and including generally parallel opposed side faces, in combination with a pair of deflectable seal legs which extend outwardly in diverging relation as continuations of the parallel side faces. The seal member is sandwiched between a pair of relatively thin film gaskets of a selected seal material, and the resultant stack is interposed between selected structural components to prevent fluid leakage therebetween.

In a preferred form of the invention, the seal member is formed as an annular seal ring constructed from a selected and relatively hard metal. The seal ring defines a seal base having the generally parallel and substantially planar axial side faces, in combination with the pair of deflectable seal legs which extend radially in axially diverging relation as smooth continuations of said axial side faces. In one form, the seal legs project radially and axially outwardly from the seal base, whereas in an alternate embodiment said seal legs extend radially inwardly and axially outwardly from said seal base. In either case, the seal ring inclusive of the seal base and seal legs is sandwiched coaxially between a pair of film gaskets. A preferred film gasket material comprises a relatively thin polyimide such as those marketed under the names Kapton or Vespel which can be coated with a thin seal coating, such as a Teflon film. Another less preferred but usable film material is Mylar polyester.

The assembled face seal assembly is positioned between a pair of selected structural components, typically by insertion of the face seal assembly into an axially open recessed seat or groove formed in one of the structural components. The structural components are then assembled typically through bolting or other external mechanical means to compressively retain the face seal assembly therebetween. The assembled structural components cooperatively deflect the seal legs toward each other into substantially coplanar relation with the axial side faces of the seal base, resulting in relatively uniform compressive loading of the seal ring throughout the axial side areas presented by the seal base and the two seal legs. The film gaskets prevent direct contact between the seal ring and the adjacent seal surfaces of the structural components. These film gaskets may be economically replaced, if required, to permit reuse of the seal ring in the event of structural component disassembly for any reason.

A preferred method of seal ring construction comprises initial formation of the seal ring having the seal legs extending from the seal base in generally parallel coplanar relation. Such seal ring construction may be performed economically in production quantities as by traditional machining processes or the like. The axially presented side areas of the thus-formed seal rings can be prepared to precision tolerances by production gang lapping or the like. The seal rings are then subjected to a roll process or the like to spread the seal legs in axially diverging relation.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 4:
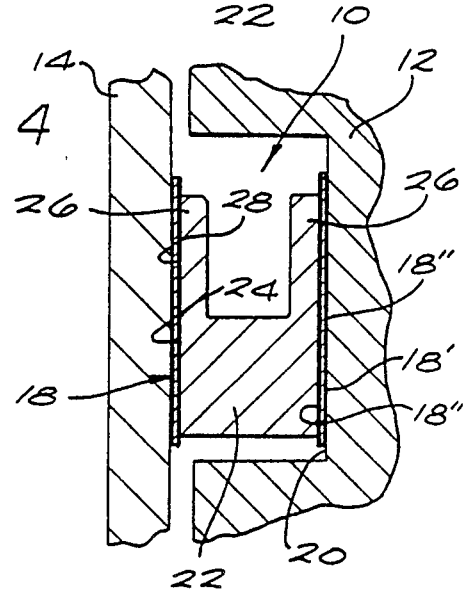
FIG. 4 is a fragmented sectional view illustrating installation of the face seal assembly of FIG. 1 between a pair of assembled structural components and with a portion thereof enlarged to show a preferred film gasket construction.

As shown in the exemplary drawings, an improved face seal assembly referred to generally by the reference numeral 10 is provided for use in preventing or minimizing fluid leakage between assembled structural components, such as the assembled housing components 12 and 14 depicted in FIG. 4.

The improved face seal assembly 10 of the present invention is particularly designed to provide a high quality fluid seal capable of withstanding relatively adverse operating conditions, such as relatively high pressure or extreme temperature or cryogenic conditions. The face seal assembly is constructed from individual components adapted for relatively economical manufacture in production quantities and in conformance with precision tolerance requirements. Moreover, these components of the seal assembly are designed for economical reuse in the event of disassembly of the structural components as may be required, for example, for repair and/or maintenance purposes. Accordingly, upon reassembly of the structural components, new and/or costly face seal structures are not required.

Figure 1:
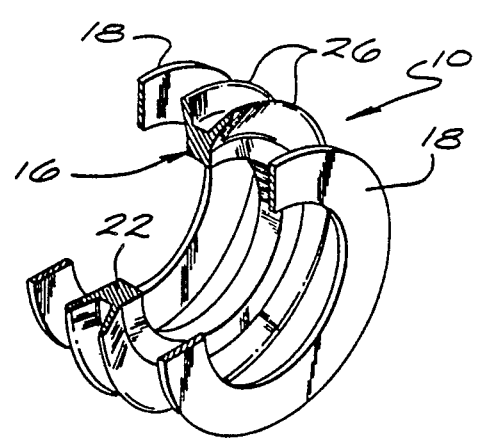
FIG. 1 is a fragmented exploded perspective view illustrating a face seal assembly embodying the novel features of the invention, and including a seal ring sandwiched between a pair of relatively thin film gaskets.

As shown best in FIG. 1, the improved face seal assembly 10 of the present invention comprises a central seal member 16 sandwiched generally in coaxial relation between a pair of generally matingly shaped film gaskets 18. These components are shown in the preferred embodiment to have a generally annular or ring shape for use in a typical mechanical static face seal environment. However, it will be understood that alternative component geometries may be used in accordance with the geometry of the housing components 12 and 14. In this regard, in a typical installation application, at least one of the housing components 12 and 14 will include a shallow recessed seat or groove 20 having a geometry for nested reception of the face seal assembly 10.

Figure 3:
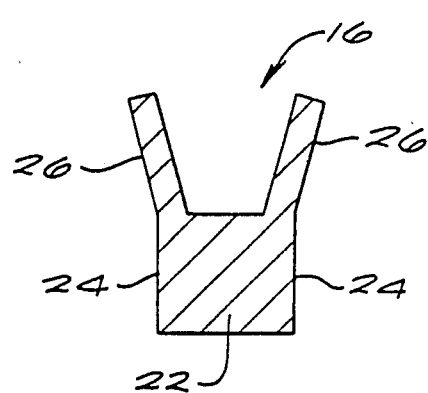
FIG. 3 is a cross sectional view similar to FIG. 3, but illustrating the cross sectional geometry of the finished seal ring.

The illustrative seal member or seal ring 16 is constructed from a selected and relatively rigid face seal material, with a metal material such as a relatively hard nickel base alloy or stainless steel or the like being preferred. The seal ring 16 is shaped to define a relatively rigid seal base 22 having an axially opposed pair of planar side faces 24 (FIG. 3) formed generally parallel to each other. The seal ring further includes a pair of comparatively thinner seal legs 26 formed integrally with the seal base 22. As shown in FIGS. 1 and 3, these seal legs 26 are formed generally at the outer periphery of the seal base 22 to extend radially outwardly in axially diverging relation to define outwardly and angularly set continuations to the parallel side faces 24. Although the seal ring 16 is constructed from a relatively rigid or stiff material, the thicknesses of the seal legs 26 are chosen to accommodate axial deflection toward each other in response to applied axial compression forces, as will be described in more detail.

The various dimensions of the seal ring 16 may vary widely in accordance with different installation requirements. For example, the diametric size of the seal ring can be constructed within a wide range to accommodate miniature or larger face seal applications. Moreover, the relative thicknesses of the seal legs and the divergence angle therebetween can be tailored to provide a selected axial load in response to axial compression forces. In a preferred form, however, the seal base 22 will have an approximate rectangular cross section geometry and a radial dimension which is approximately equal to or greater than the radial dimension of the seal legs 26 to accommodate the required operating pressure. Moreover, in a typical high pressure operating environment, the radially outermost tips of the seal legs 26 will be spaced axially outboard with respect to the side faces 24 by a few thousands of an inch. This relative outboard spacing is depicted in the drawings in a somewhat exaggerated form for ease of description and clarity of illustration.

Figure 2:
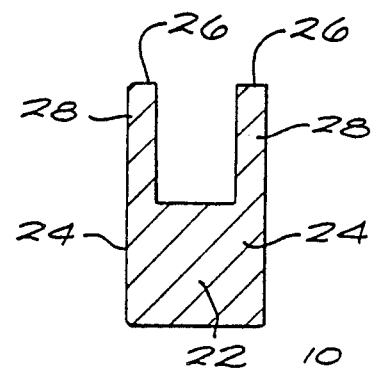
FIG. 2 is a cross sectional view illustrating the configuration of a partially formed seal ring for use in the face seal assembly of FIG. 1.

In accordance with a preferred method of construction, the seal ring 16 is preliminarily shaped as by machining from rod or sleeve stock to include the seal legs 26 in generally parallel relation to each other, as viewed in FIG. 2. More specifically, the seal ring can be manufactured in production quantities with relatively precision tolerances to include the seal base 22 having the seal legs 26 projecting in parallel therefrom. In this preliminary configuration, the axially outboard surfaces 28 of the seal legs 26 are formed in coplanar relation with corresponding side faces 24 of the seal base 22. These coplanar surfaces 24 and 28 can be precision formed and precision finished in production quantities by gang lap grinding or the like, all in a relatively economical manner. The resultant seal ring preform is then subjected to a conventional rolling step or the like for angularly spreading the seal legs 26 to a selected angle of divergence, as viewed in FIG. 3. Such rolling step can be performed economically and at a relatively high production rate, substantially without adverse effect upon precision formation of the side surfaces 24 and 28.

In use, the thus-formed seal ring 16 is coaxially interposed between the pair of film gaskets 18 formed from a selected seal material, such as a polymer material, with the resultant stack forming the face seal assembly 10. A preferred seal material comprises a relatively thin sheet of polyimide or the like which is available commercially under the names Kapton or Vespel from E. I. DuPont De Nemours & Company, Wilmington, Del. This sheet material is available in precision selected film thickness such as on the order of 0.001 inch, and commonly includes an additional seal film or coating 18" of much softer Teflon or the like applied with precision thickness on one or preferably both sides thereof. A less preferred but usable film is polyester marketed by DuPont under the name Mylar. The gaskets 18 can be economically die cut or the like in production quantities from this material to have a radial dimension for substantially completely overlying the axial side surfaces 24 and 28 of the seal ring 16.

The assembled stack of face seal components is nested within the appropriate seat 20 in the structural housing component 12, as shown in FIG. 4. The housing components 12 and 14 can then be assembled by means of appropriate mechanical fasteners (not shown) to compressively retain the face seal assembly 10 therebetween. In this regard, compressive retention of the face seal assembly is accompanied by axially inward deflection of the seal legs 26 to re-orient the leg side surfaces 28 toward generally coplanar relation with the side faces 24 of the seal base 22. In this position, the housing components 12 and 14 bottom against the rigid seal base 22, with the seal legs 26 providing a predetermined axial loading force applied to both housing components. Importantly these loading forces are substantially uniformly distributed over the broader axial surfaces of the seal ring, including the side faces 24 and the outboard surfaces 28 of the seal legs 26. The direction of the seal legs 26 are beneficially oriented with respect to pressure such that the legs 26 extend toward and are axially spread by a relatively high pressure region.

The film gaskets 18 beneficially prevent direct contact between the seal ring 16 and the adjacent housing components 12 and 14, while additionally providing high quality fluid sealing between these components. The film gaskkets 18 therefore effectively prevent structural damage to the housing components due to brinnelling or the like. Advantageously, this arrangement permits the seal ring 16 to be reused following disassembly of the structural components 12 and 14 for any reason, such as may be required for repair or replacement of other components in a fluid control valve. The film gaskets 18 may also be reused, or replaced with relatively inexpensive new gaskets, as desired.

Figure 5:
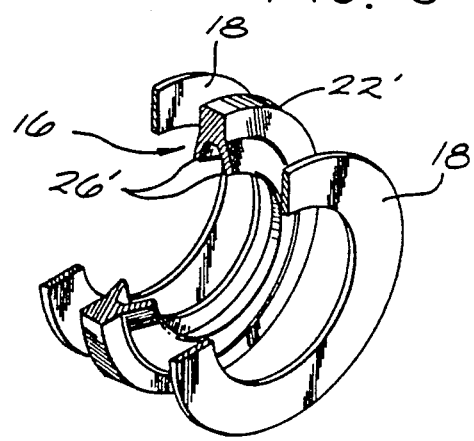
FIG. 5 is a fragmented exploded perspective view similar to FIG. 1, but depicting an alternative preferred form of the invention.

FIG. 5 illustrates one alternative preferred form of the invention, wherein a modified seal ring 16 is interposed between film gaskets 18 of the type depicted in FIG. 1, and FIG. 4. This alternative face seal assembly corresponds with the embodiment shown in FIG. 1, except that a seal base 22' supports a pair of seal legs 26' which extend radially inwardly therefrom in axially diverging relation. Accordingly, the seal base and seal legs as depicted in FIG. 5 are inverted relative to the embodiment shown in FIGS. 1-4. In use, the face seal assembly of FIG. 5 functions in the same manner as described with respect to FIG. 4.

Figure 6:
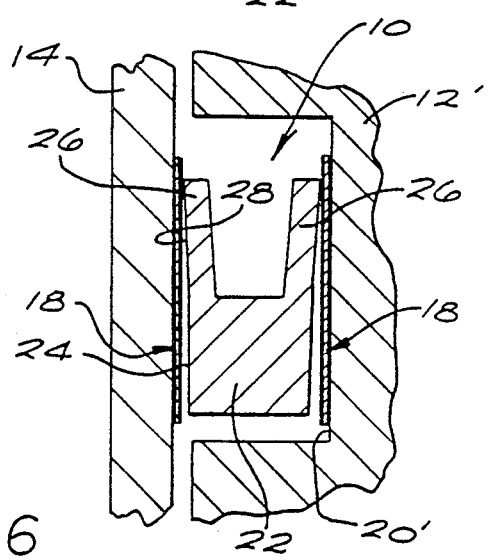
FIG. 6 is a fragmented sectional view similar to FIG. 4 but illustrating an alternative structural component configuration.

FIG. 6 illustrates an alternative structured component geometry for use with the seal assembly 10, wherein the axially inward compression or deflection of the seal legs 26 and the resultant seal load is controlled by the depth of a groove 20' in a housing component 12' which abuts the other housing component 14. In this configuration, the seal legs 26 are partially deflected toward each other, with such partial deflection being illustrated in FIG. 6 in exaggerated form.

The face seal assembly 10 of the present invention thus provides a relatively simple and economically produced face seal structure for providing a high quality seal in high pressure or other adverse operating condition environments. The invention is adapted for economical construction and provides a reliable and long term, reusable service life.

A variety of further modifications and improvements to the present invention will be apparent to those skilled in the art. Accordingly, no limitation on the invention is intended by way of the foregoing description and accompanying drawings, except as set forth in the appended claims.

What is claimed is:
1. A face seal assembly, comprising:
   a seal member having a seal base defining an axially opposed pair of side faces, and a pair of seal legs extending from said seal base generally in a common direction and defining a pair of axially outboard side surfaces as axially diverging continuations of said side faces; and
   a pair of film gaskets unconnected to said seal member and having a size and shape for respectively overlying axially opposed sides of said seal member.

2. The face seal assembly of claim 1 wherein said seal member comprises a metal seal member, and wherein said film gaskets comprises a selected polymer film material.

3. The face seal assembly of claim 2 wherein said film gaskets further include a seal coating on at least one side thereof.

4. The face seal assembly of claim 2 wherein said polymer film material comprises a polyimide.

5. The face seal assembly of claim 1 wherein said seal member and said film gaskets have a generally conforming closed loop geometric shape.

6. The face seal assembly of claim 1 wherein said seal member comprises a seal ring, and wherein said film gaskets comprise gasket rings.

7. The face seal assembly of claim 6 wherein said seal legs project generally radially outwardly from said seal base with at least slight axial divergence.

8. The face seal assembly of claim 6 wherein said seal legs project generally radially inwardly from said seal base with at least slight axial divergence.

9. The face seal assembly of claim 6 wherein said seal base has a generally rectangular cross sectional shape having a radial dimension corresponding generally with a radial dimension of said seal legs.

10. The face seal assembly of claim 1 wherein said side faces of said seal base are formed generally in parallel to each other.

11. A face seal assembly, comprising:
   a seal ring formed from a relatively hard seal material to define a seal base having an axially opposed pair of generally parallel and generally planar side faces, and a pair of seal legs extending from said seal base in a common radial direction with at least slight axial divergence and defining a pair of axially diverging side surfaces formed as continuations of said side faces; and
   a pair of generally annular film gaskets formed from a selected soft seal material and respectively overlying said side faces and side surfaces at axially opposed sides of said seal ring.

12. The face seal assembly of claim 11 wherein said seal ring comprises a metal seal ring, and wherein said film gaskets are formed from a polymer material.

13. The face seal assembly of claim 12 wherein said polymer material comprises a polyimide coated with a Teflon film on at least one axial side thereof.

14. The face seal assembly of claim 11 further in combination with a pair of structural components, said seal ring being sandwiched between said film gaskets to define a stack sandwiched in turn between said structural components to prevent fluid leakage between said structural components, said structural components applying axial compression forces to said stack to deflect said seal legs toward a position with said side surfaces respectively disposed in generally coplanar relation with said side faces.

* * * * *

UNITED STATES PATENT AND TRADEMARK OFFICE
CERTIFICATE OF CORRECTION

PATENT NO. : 4,998,740

DATED : March 12, 1991

INVENTOR(S) : Gilbert F. Tellier

It is certified that error appears in the above-identified patent and that said Letters Patent is hereby corrected as shown below:

Column 6, Line 67:

after the word "of" insert --separate and--

Signed and Sealed this

Twenty-eighth Day of July, 1992

*Attest:*

DOUGLAS B. COMER

*Attesting Officer*     *Acting Commissioner of Patents and Trademarks*